Oct. 3, 1944.　　　F. O. JOHNSON　　　2,359,423
HYDRAULIC TRANSMISSION
Filed March 31, 1941　　　8 Sheets-Sheet 1
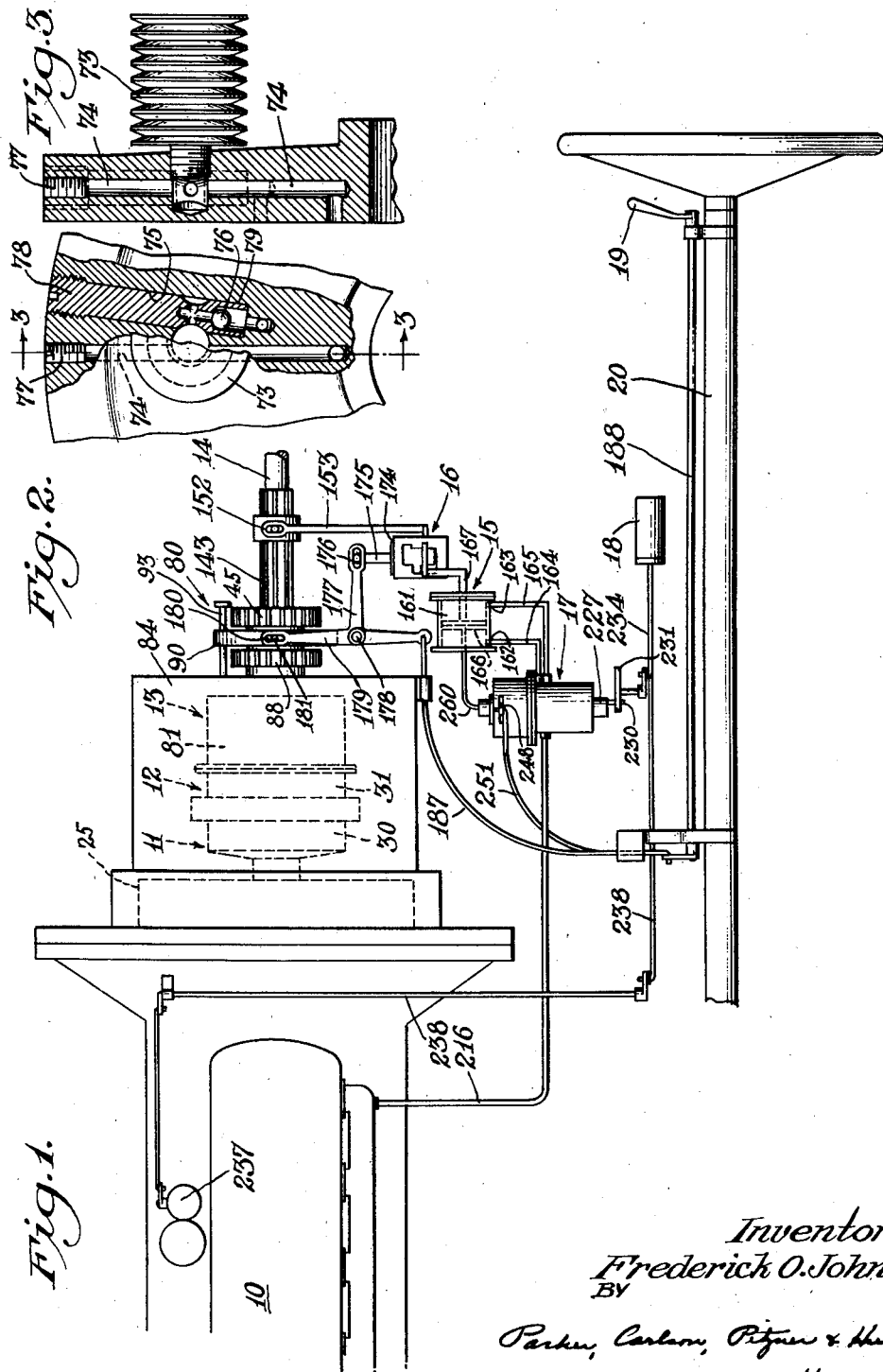
Inventor
Frederick O. Johnson
BY
Parker, Carlson, Pitzner & Hubbard
Attorneys.

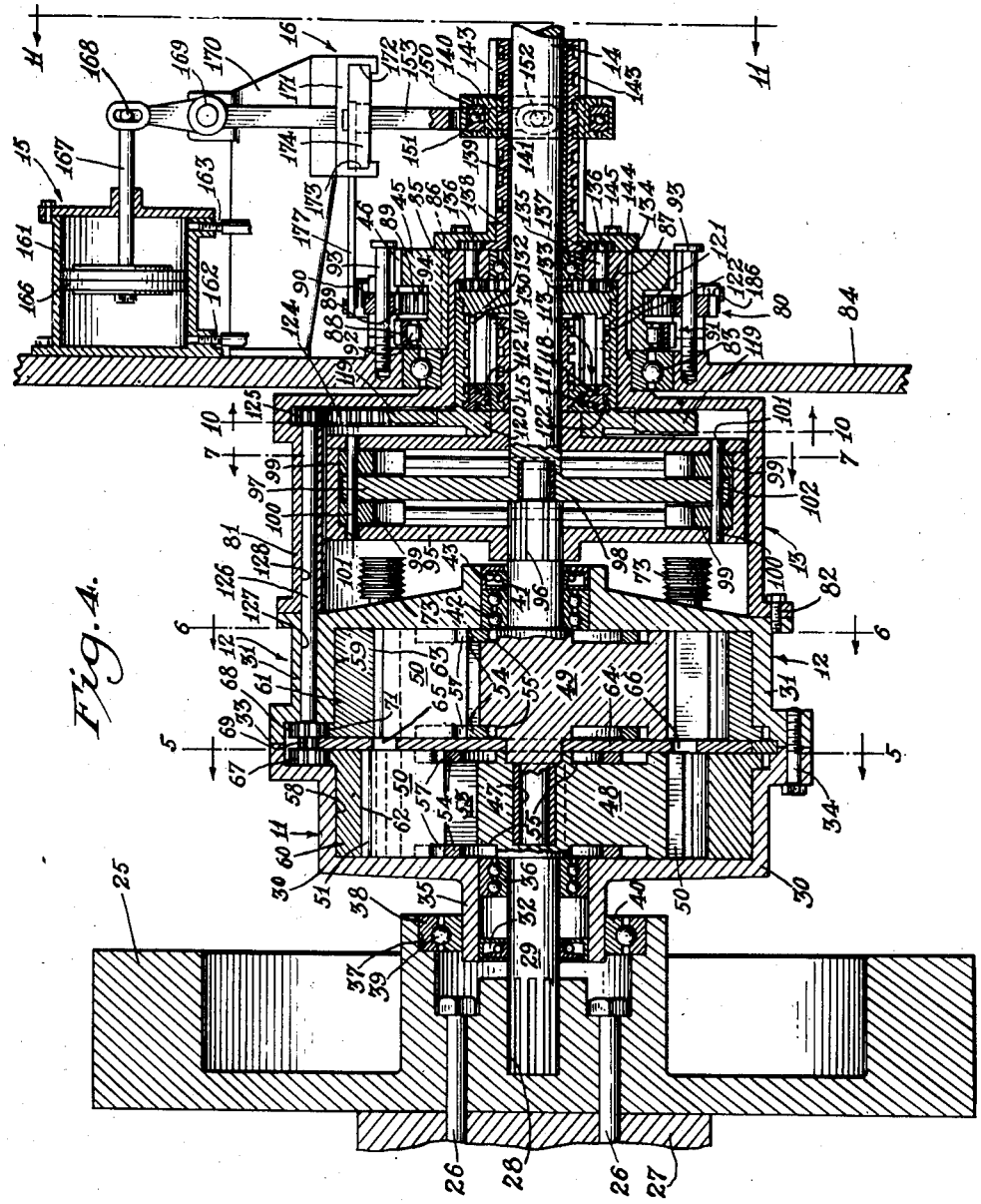

Oct. 3, 1944.   F. O. JOHNSON   2,359,423
HYDRAULIC TRANSMISSION
Filed March 31, 1941   8 Sheets-Sheet 3

Inventor
Frederick O. Johnson
BY
Parker, Carlson, Pitzner & Hatland
Attorneys.

Oct. 3, 1944.　　　F. O. JOHNSON　　　2,359,423
HYDRAULIC TRANSMISSION
Filed March 31, 1941　　　5 Sheets-Sheet 4
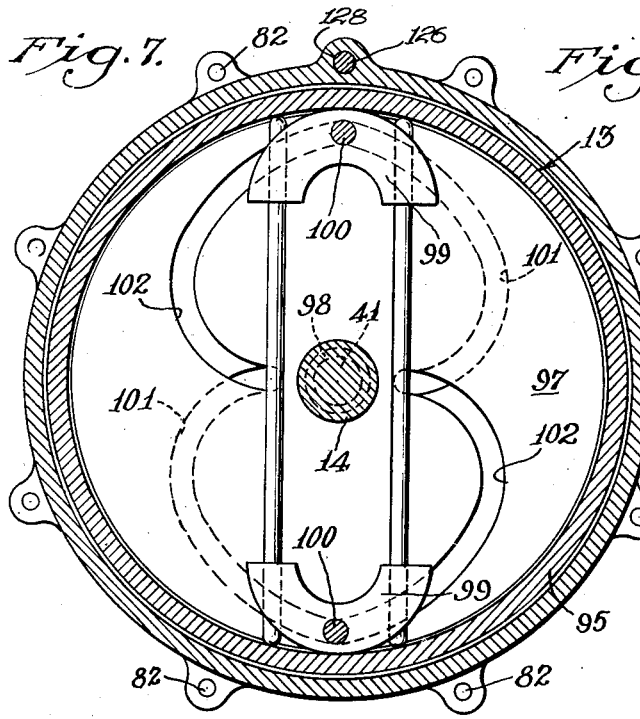
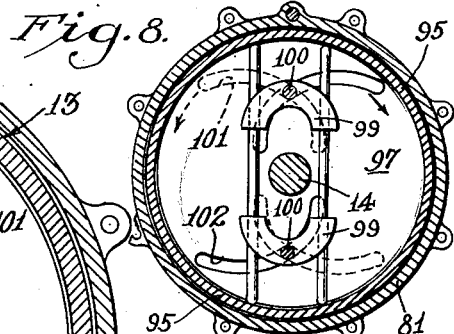
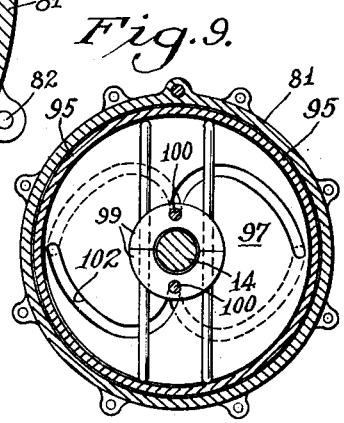
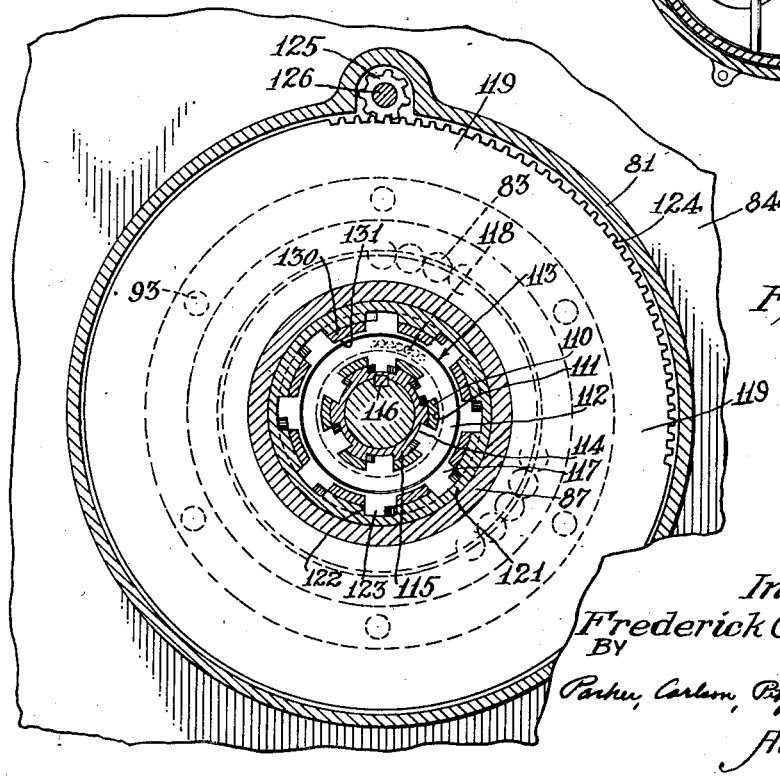
Inventor
Frederick O. Johnson
BY
Parker, Carlson, Pitzner & Hubbard
Attorneys.

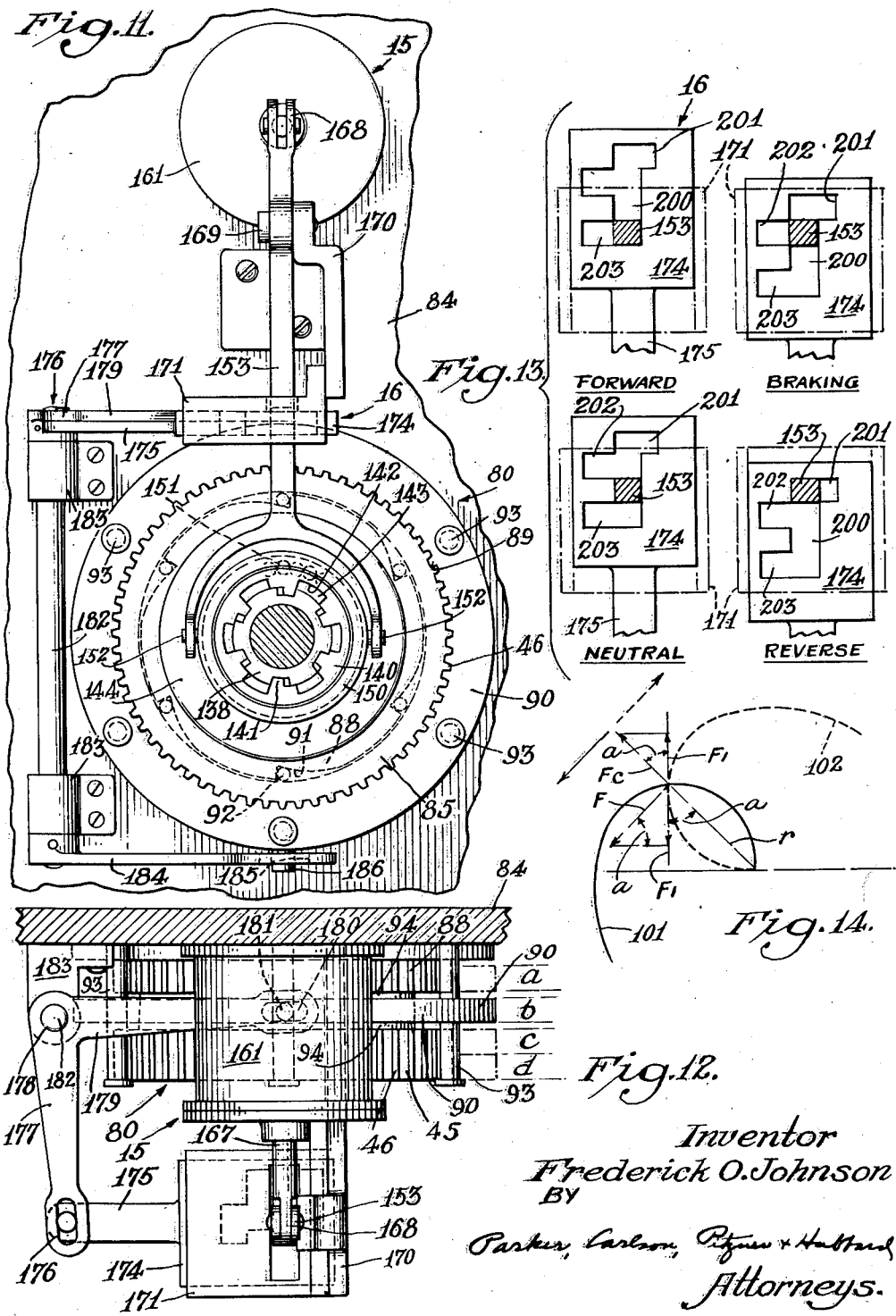

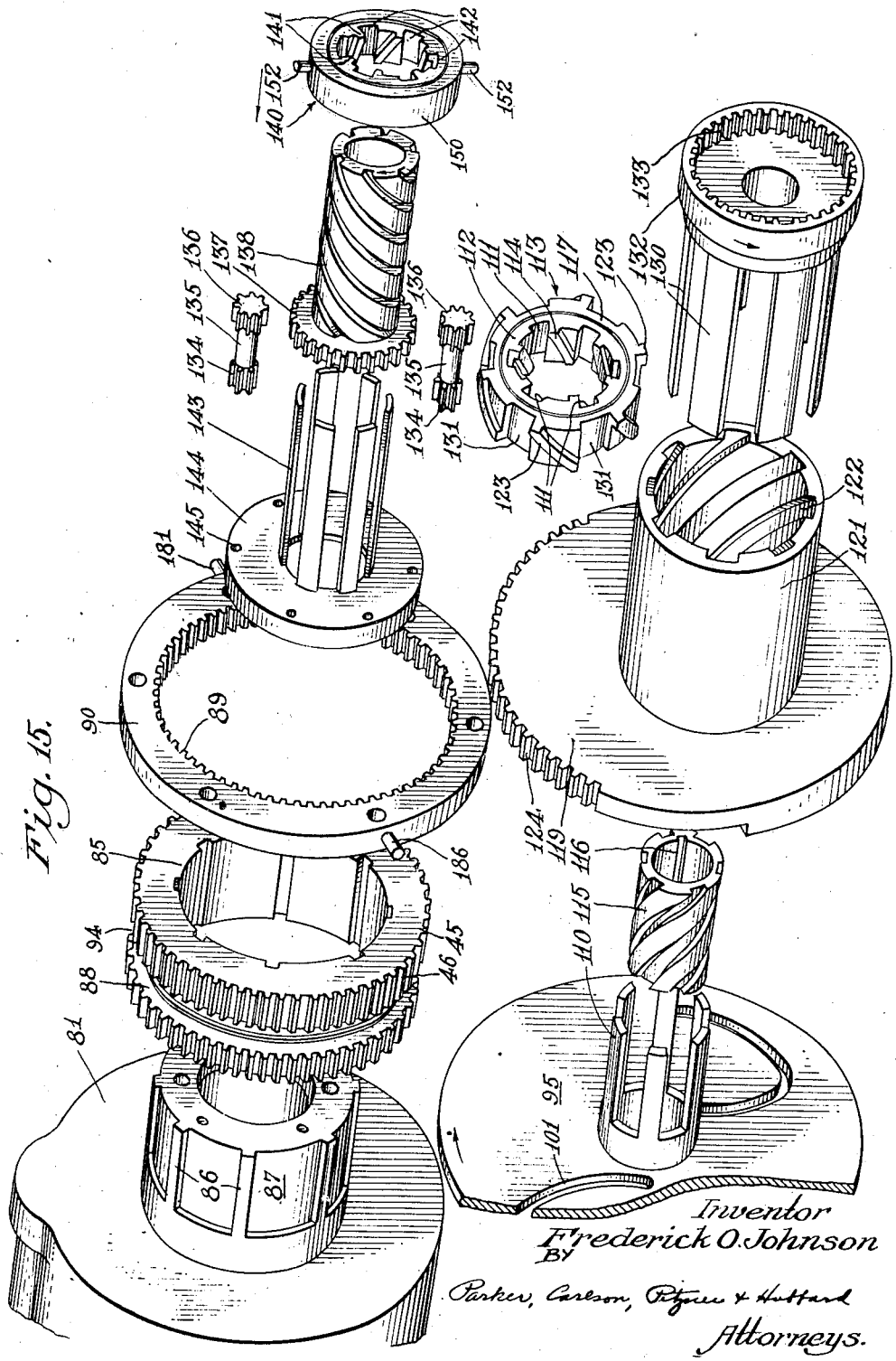

Oct. 3, 1944.  F. O. JOHNSON  2,359,423
HYDRAULIC TRANSMISSION
Filed March 31, 1941   8 Sheets-Sheet 7
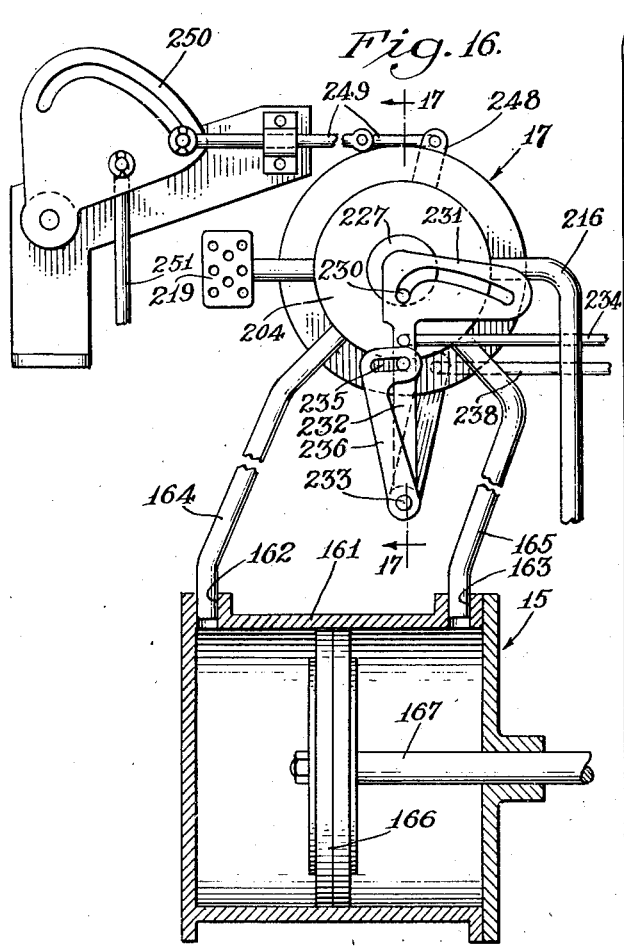
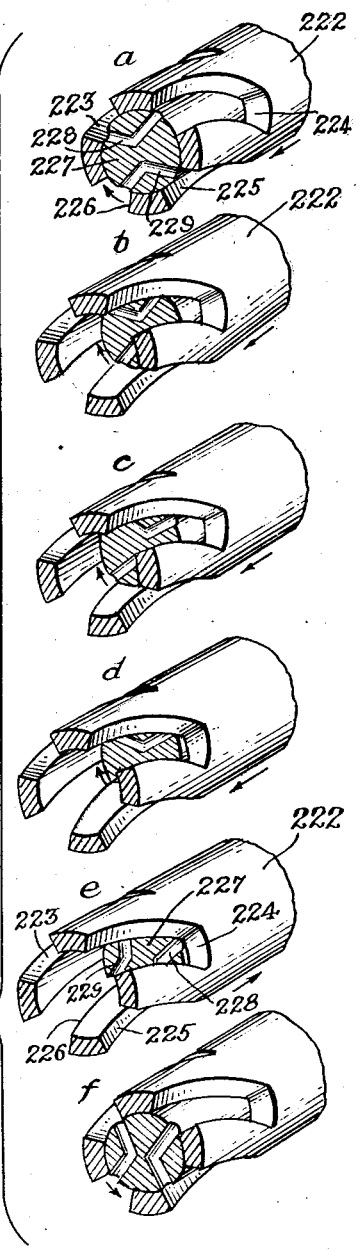
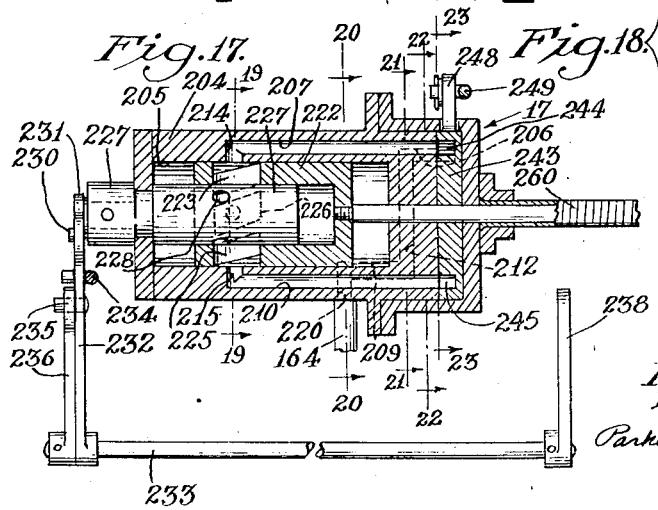
Inventor
Frederick O. Johnson
BY Parker, Carlson, Pitzner & Holland
Attorneys.

Oct. 3, 1944. F. O. JOHNSON 2,359,423
HYDRAULIC TRANSMISSION
Filed March 31, 1941 8 Sheets-Sheet 8
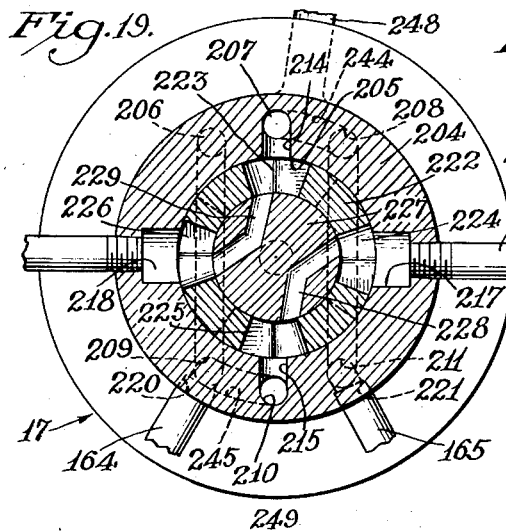
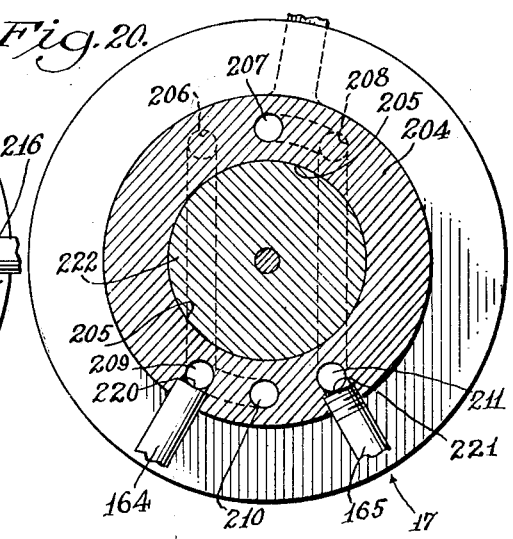
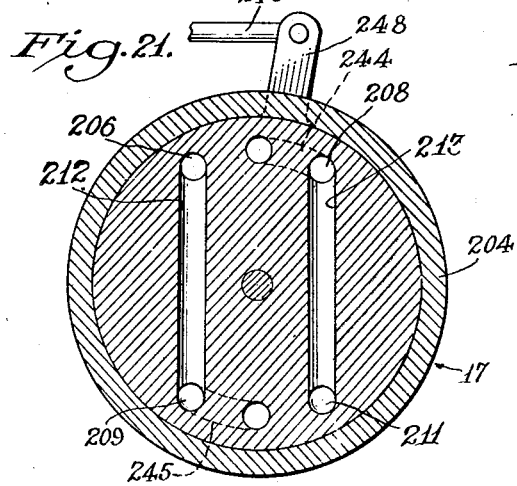
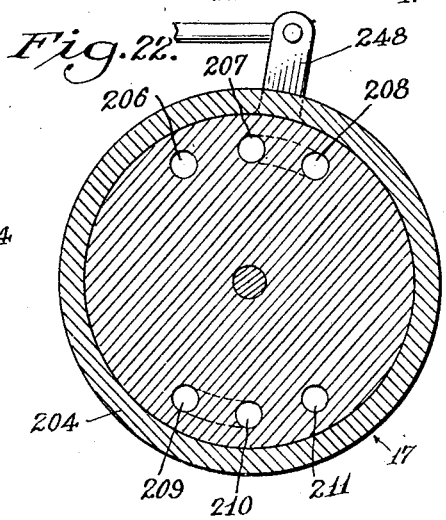
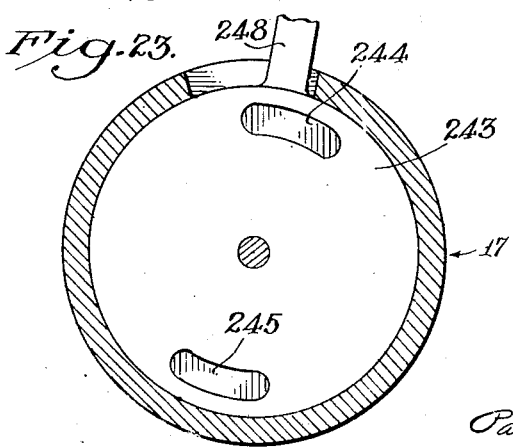
Inventor
Frederick O. Johnson
By
Parker, Carlson, Pitzner & Hubbard
Attorneys.

Patented Oct. 3, 1944

2,359,423

UNITED STATES PATENT OFFICE 2,359,423

HYDRAULIC TRANSMISSION

Frederick O. Johnson, Chicago, Ill.

Application March 31, 1941, Serial No. 385,991

36 Claims. (Cl. 60—19)

The invention relates to devices for transmitting power from a prime mover to a driven member and, more particularly, to such devices embodying hydraulic apparatus capable of effecting automatic changes in the power-speed transmission ratios between driving and driven members.

The necessity for such transmission devices and their wide variety of fields of application are generally well known. For example, apparatus of the present invention may be employed for transmitting power at variable speeds and torque amplification ratios from internal combustion engines used in connection with automobiles, tractors, trucks, buses, tanks, and many other types of motor driven vehicles. In addition, the invention may be applied to stationary combustion engine units requiring variable speed transmission. Moreover, many aspects and features of the present invention may well be employed in connection with prime movers of any conceivable type, other than internal combustion engines.

The invention has for one of its primary objects the provision of a novel and useful power transmission of the hydraulic type capable of effecting automatic speed and torque amplification changes in accordance with the load demand of the driven member, to the end that power may be efficiently transmitted at the highest possible rate commensurate with the power input.

Another object of the invention is to provide a transmission of the above mentioned general type embodying a novel hydraulic pump and motor unit which is simple and sturdy, which embodies a novel and extremely simple adjustment to produce variations in the transmission ratio between the driving and driven members, which is capable of effecting torque amplification variable in minute increments between an exceedingly large amplification, if desired, and a one-to-one ratio between driving and driven members, and which, when the latter condition obtains, displaces no fluid between the pump and the motor, the unit automatically changing from a hydraulic torque amplifying coupling to a substantially fixed direct drive coupling.

It is a further object of the invention to arrange the hydraulic units of the transmission system in such a manner that the operating pressure fluid flows between the pump chamber and the motor chamber through a single unrestricted orifice plate, thereby obviating circuitous fluid passage resistance to flow and minimizing frictional losses and emulsification tendency of the pressure fluid.

It is a further object of the invention to provide a novel automatic control coupling between driving and driven members which correlates speed of rotation and load demand to vary the transmission ratio in response to a balance position between reacting torque and centrifugal force at such coupling.

It is another object of the invention to provide a novel form of hydraulic transmission inherently and normally capable of effecting so called "free wheeling" of the vehicle with which it is associated.

It is a still further object to provide novel means for controlling the transmission to effect any desired degree of braking between direct motor drag and complete locking of the drive shaft.

It is another object of the invention to provide a novel transmission mechanism of this type which serves as a so-called "no back-up" brake to facilitate control of a vehicle or other machine with which the mechanism may be associated.

It is a further object of the invention to provide a novel controlled transmission mechanism for a vehicle or the like in which the entire operation of the vehicle is effected under the supervisory control of a single operator's control lever and a foot throttle or accelerator pedal.

In conjunction with the foregoing object it is a further object of the invention to initiate a controlled transmission operation by the initial depression of the accelerator pedal prior to motor acceleration which operation, upon motor acceleration, is effective to establish a particular type of drive depending upon the setting of the operator's control lever.

Further objects and advantages of the invention will become apparent as the following description proceeds, taken in connection with the accompanying drawings, in which:

Figure 1 is a diagrammatic layout of a system embodying the features of my invention as applied to an automotive vehicle of the internal combustion engine type.

Fig. 2 is an enlarged, fragmentary, detailed view of a device capable of compensating for fluid expansion.

Fig. 3 is a sectional view taken on line 3—3 of Fig. 2.

Fig. 4 is a longitudinal cross-sectional view of a transmission embodying features of the invention.

Figs. 5 and 6 are enlarged cross-sectional views taken on lines 5—5 and 6—6, respectively, of Fig. 4.

Fig. 7 is an enlarged cross-sectional view taken on line 7—7 of Fig. 4.

Figs. 8 and 9 are views similar to Fig. 7 on a reduced scale showing the centrifugal elements of the control couple in intermediate and innermost positions, respectively.

Fig. 10 is an enlarged sectional view taken on line 10—10 of Fig. 4.

Fig. 11 is an enlarged fragmentary end face view of the mechanism shown in Fig. 4 and looking in the direction of the arrows of line 11—11.

Fig. 12 is a fragmentary plan view of the mechanism shown in Fig. 11.

Fig. 13 shows a selector mechanism in its various control positions.

Fig. 14 is a vector diagram explanatory of the mechanism shown in Figs. 7, 8 and 9.

Fig. 15 is an exploded perspective view on an enlarged scale, showing in detail certain elements of the automatic control mechanism.

Fig. 16 is an end view, partially in section, illustrating a control valve and vacuum motor used in connection with the automatic control.

Fig. 17 is a longitudinal, vertical sectional view of the valve mechanism taken on line 17—17 of Fig. 16.

Fig. 18 is a detailed perspective view illustrating various relative port positions of the valve mechanism shown in Figs. 16 and 17.

Figs. 19, 20, 21, 22 and 23 are enlarged sectional views of the valve mechanism taken along lines 19—19, 20—20, 21—21, 22—22, 23—23, respectively, of Fig. 17.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to Fig. 1 of the drawings, I have shown therein, diagrammatically, an exemplary form of hydraulic transmission in connection with an internal combustion automobile engine 10, and embodying apparatus in accordance with my invention. In brief, this engine drives a hydraulic pump 11 (Fig. 4), which delivers pressure fluid to a hydraulic motor 12 connected, through an automatic torque-speed control couple 13, to some driven member, illustrated herein simply as a shaft 14, but which might well be, of course, any one of a number of driven devices. The transmission system is controlled automatically by a pressure piston mechanism 15, a selector mechanism 16, and a fluid valve mechanism 17, all under the supervisory control of manual devices, herein illustrated in connection with a foot throttle or accelerator 18 and a hand lever 19 mounted, for convenience, on a conventional automobile steering column 20.

Since the pump 11 and the motor 12 constitute the basis of the speed-change torque amplification coupling between driving and driven members, an intimate understanding of their function and operation is desirable preliminary to a description of the devices employed for their control. Accordingly, the unit comprising the pump and motor elements will be described in detail first.

Generally, the objects of this unit (illustrated in Figs. 4, 5 and 6) are attained, in the present embodiment, by employing, as part of the driving connection between two shafts, a pair of rotary hydraulic units of the radially slidable vane type, coaxially mounted in a housing and adapted to deliver and receive, respectively, pressure fluid through a ported division plate, constituting a valve, mounted between them. The former, or pump unit, has a vane carrying rotor rigid with the drive shaft, and the latter, or motor unit, has a rotor rigid with a transmission shaft. Adjustable means for changing the relative eccentricities of the rotors to the housing are provided to vary the output of the pump and the displacement of the motor, in the present embodiment simultaneously and in opposite senses, for the purpose of effecting incremental speed changes varying from a large torque amplification ratio between the shafts to a one-to-one ratio. When the latter condition obtains, fluid pumping action ceases and the entire pump-motor unit, together with its housing, rotates with the shafts as a fixed direct driving coupling.

As seen at the left end of Fig. 4 (the forward end of the transmission), a flywheel 25 is suitably secured, as by bolts 26, to a flange 27 of a crank shaft (not shown). A drive shaft 29 is secured centrally of the flywheel for rotation therewith by a multiple spline connection 28. The drive shaft extends rearwardly into the pump-motor housing 30, 31 preferably through an oil seal or packing gland 32 of any suitable type to seal the housing against fluid leakage along the shaft. The housing proper for this unit comprises two parts, a pump housing 30 and a motor housing 31 drawn together in fluid sealing relation at their meeting edges 33 by a suitable bolt and tapped-hole arrangement 34, as shown.

While the unit 11, 12 is acting as a torque amplifying coupling, provision must be made for relative rotational movement between the housing and the shaft 29. While the unit serves as a direct drive coupling, there is no relative rotational movement between the flywheel 25, the shaft 29 and the housing 30. Accordingly, to provide a simple and sturdy assembly for these parts, the housing is journaled directly in the flywheel and the shaft 29 is journaled within the housing. Thus, the housing is provided with a pilot head or bearing sleeve 35 in which the drive shaft 29 is suitably journaled for rotation, as by a ball bearing 36. An annular groove 37 adapted to receive the outer race 38 of a ball bearing 39 is formed concentrically on the flywheel, while a complementary inner race 40, adapted for cooperation therewith, is mounted on the exterior surface of the pilot head 35. Similarly, a transmission shaft 41 is journaled for rotation in the opposite end of the housing by means of a suitable bearing 42 and the housing is sealed against leakage along the shaft by a suitable oil seal 43.

The drive and transmission shafts are coaxially alined with the end of the latter suitably journaled in the adjacent end of the former, as indicated at 47. The shafts 29 and 41 carry rotors 48 and 49, respectively, situated within the pump housing 30 and the motor housing 31, respectively, and each is adapted to carry a plurality of radially slidable pumping vanes 50. The inner bores 58 and 59 of the pump and motor housings, respectively, are eccentric to the axis of the pump and motor rotors and are of equal diameter. Within these eccentric bores are two eccentric sleeves or rings 60 and 61, respectively, rotatable in the bores 58 and 59 of the housings 30 and 31, the interiors of said rings being indicated at 62 and 63. The relationship is such that the centers of the eccentric sleeves 60 and 61 can be made to coincide with the axes of the rotors, or, upon selective rotation of the sleeves within the bores 58 and 59, various degrees of eccentricity may be produced between the rotors and the sleeves.

The radially disposed pumping vanes 50 are slidably received within slots 53 of the rotor structures 48 and 49. Each vane has an outer bearing head 51 formed with a curved surface having the same radius as that of the inner surface of the eccentric sleeves and adapted for close running engagement therewith. The bearing heads 51 are mounted upon the vanes for rocking movement, each being formed with a curved surface in contact with the outer curved edge of the vane. Thus, the outer bearing surface will register uniformly on the inner surface of the eccentric sleeve regardless of the angular disposition of the vane within the housing. Each rotor is provided with a pair of floating rings 54 carried within recessed lateral grooves 55 of the rotors for supporting the inner ends of the vanes to maintain their concentric spaced relationship with respect to the sleeves. Formed on the inner lateral edges of each vane are shoes 57 adapted to bear on the rings 54. The inner edge of each shoe is rounded to provide an arcuate cam surface which compensates for changes in the angular disposition of the vanes with respect to the sleeves and rings as the hydraulic units are adjusted between zero and maximum eccentricities (see Figs. 5 and 6). The radial distance between the floating rings 54 and the inner peripheries of the sleeves is always equal, but the vanes are disposed at a slight angle to the radius when other than concentric conditions obtain. The arcuate cam surfaces of the shoes are so formed as to compensate for this change in effective length of the vanes.

Within the housing 30, 31 and between the pump and motor rotors a division plate 64 is provided, which serves to port pressure fluid from the pump to the motor and also exhaust fluid from the motor to the pump. To this end, arcuate inlet and outlet ports 65 and 66 are formed in the division plate 64. The eccentric sleeves 60 and 61 are mounted within the pump and motor housings so that the inner bore of the pump sleeve 60 is concentric with the axis of the pump rotor 48 when the motor sleeve 61 is in its position of maximum eccentricity relative to the motor rotor. This is the neutral setting, in which position rotation of the pump rotor will cause fluid to be carried around with the vanes but none will be displaced from the pump housing to the motor housing and no power will be transmitted to the motor rotor.

Means are provided for rotating the sleeves 60 and 61 simultaneously to increase the pump rotor eccentricity from its position of zero eccentricity and, concurrently, to decrease the motor rotor eccentricity. Thus, the sleeves are rotated simultaneously and in the same direction, but the effect is to vary the eccentricities of the pump and motor chambers in opposite senses. In operation, one-half of the pump chamber receives exhaust fluid from the motor while the other half discharges pressure fluid to the motor, and one-half of the motor chamber receives pressure fluid from the pump while the other half discharges to the pump. The axis of symmetry, or the center line between the discharging half and the intake half of the pump, coincides with the axis of symmetry of the motor in all positions of adjustment. To this end the eccentric sleeves 60 and 61 are so mounted in the pump and motor chambers as to position their centers 90° apart and the valve plate 64 is positioned so as to dispose its arcuate ports 65 and 66, respectively, on each side of the axes of symmetry. Due to the eccentric mounting of the sleeves within the housing 30, 31, the coincident axes of symmetry of the pump and motor rotate only one half the angle of rotation of the eccentric sleeves upon adjustment. Accordingly, provision is made for rotating the valve plate 64 concurrently with, but only one half the angle of rotation of the sleeves. Thus, a cluster gear is mounted peripherally of the sleeves and within the housing 30, 31 and comprises three gears, the two outer gears 67 and 68 of which rotate the sleeves 60 and 61, respectively, while the inner gear 69 rotates the ported division plate. The latter gear 69 is of such a size as to rotate the plate one-half the angle of rotation of the sleeves. The sleeves and the plate are formed on their peripheral surfaces with circular gear racks 70, 71 and 72 for meshing engagement with the cluster gear.

It will be apparent that, upon rotation of the cluster gear from its neutral setting, as shown in Figs. 4, 5 and 6, the eccentricity of the pump chamber will be increased as the eccentricity of the motor chamber is decreased, so that pressure fluid will be displaced from the pump to the motor, and power will be transmitted from the pump rotor to the motor rotor. Initially fluid displacement will be in small quantities to effect a large torque amplification between the driving and transmission shafts, fluid displacement gradually increasing as the cluster gear is rotated until the degree of eccentricity of each of the chambers coincides. At this point power is transmitted between the shafts at a ratio of one to one.

Upon operation of a closed hydraulic system of this type for any appreciable length of time, a certain amount of heat develops causing the fluid medium to expand. Expansion in the working chambers of the pump motor might result in a building up of pressure in the interior of the rotors 55 and around the bearings 36 and 42 beyond the capacity of the oil seals. To accommodate expansion and prevent fluid loss a pair of automatic by-pass valves (Figs. 2, 3 and 4) leading to expansion bellows 73 on the motor chamber are incorporated. A bore 74 is formed in the motor housing having a port opening to the interior of the motor chamber in the area of the recess 55 in the motor rotor. This bore communicates directly with the expansion bellows 73. Another bore 75 in the motor housing opens to the fluid working chambers and communicates through a check valve 76 with the expansion bellows 73. The bores 74 and 75 may be suitably closed by a pair of plugs 77 and 78, respectively, the latter having an extended inner end portion 79, which carries the check valve 76. Fluid leakage due to expansion or otherwise from the pressure fluid chambers to the interior of the rotors is brought back to the working chambers through the bore 74 to the expansion bellows 73, and thence through the check valve 76 to the exhaust or low pressure side of the motor chambers. The check valve 76 prevents the fluid in the pressure chambers of the motor from short circuiting and also prevents fluid under pressure from passing into the bellows. Conveniently, the bores 74 and 75 may be employed for filling the system with hydraulic fluid.

Since the housing 30, 31 is, under certain conditions, a free body, freely rotatable relative to its associated mechanisms, pumping action will tend to cause it to rotate in one direction or another, depending upon the conditions of eccentricity of the pump and motor chambers. Upon initiation of pumping action, that is, when the sleeves are rotated slightly from their neutral position, the force exerted by the pressure fluid on the inside of the motor chamber acts through a longer moment arm than does that in the pump chamber, thereby tending to rotate the housing in the opposite direction from the rotation of the rotors. When the sleeves have been rotated approximately 90° from their neutral position, the chambers of the pump and motor will have the same eccentricity and the rotors will rotate at the same speed. The resultant pressure on the circumferences of the pump and motor chambers will be equal and opposite, and, accordingly, there will be no tendency for the housing 30 to rotate except from frictional drag. However, rotation of the sleeves only very slightly more than 90° will cause a resultant pressure on the circumference of the pump chamber to act on a longer moment arm than that in the motor chamber and will thereby cause the housing to rotate in the same direction as that of the rotors and also at the same speed. When this condition obtains, pumping action ceases, no fluid is displaced from the pump to the motor and the entire unit rotates as a fixed direct drive coupling.

Selectively adjustable means are provided for controlling the rotation of the housing 30, 31 under various driving conditions, as, for example, when the transmission is used in connection with an automotive vehicle. During normal forward speed operation, the housing must be locked against reverse rotation during the initial stages of acceleration, when the transmission is operating as a torque amplifying coupling and until a one-to-one ratio is reached. At the latter stage rotation of the housing must be permitted in the direction of rotation of the rotors to effect direct drive coupling. Similarly, during braking and during reversing, in which latter condition direct drive coupling is not used, the housing must be locked against rotation in either direction. As will be seen in Figs. 1, 4, 11, 12 and 15, the means for controlling the rotation of the housing comprises an overriding clutch mechanism, generally indicated at 80. An extended bell housing 81 is bolted, as indicated at 82, to the rear side of the housing 30, 31 and is journaled for rotation with the housing 30, 31 by means of a suitable bearing 83 in a stationary frame member 84 of the automobile. An annular ring 85 is splined, as at 86, to a hub portion 87 of the bell housing 81 and has an outer ring gear 88 having teeth adapted for engagement with internal teeth 89 in a lock ring 90. The outer ring gear 88 is, an overriding clutch and is carried by the ring 85 for free rotation in the forward-speed direction and is locked against rotation in the reverse direction. In this instance, it comprises a roller type frictional ratchet gearing mechanism 91 (see Fig. 11), having a conventional roller and ratchet wheel arrangement. Upon rotation in one direction, the rollers 92 between the ratchet wheel formed on the ring 85 and the outer ring 88 are wedged between the wheel and the ring as they move up the inclined edges of the teeth. The lock ring 90 is longitudinally slidable on studs 93 along the axis of the driving and driven shafts and is constrained against rotation by means of the studs 93 which are screw-threaded in the frame 84. The annular ring 85 is provided with an annular clearance space 94 with which the lock ring is adapted to register longitudinally in the position shown in Fig. 4 for free rotation of the housing in either direction. The annular ring 85 is also provided with an integral ring gear 45, of the same external diameter as the outer ring 88, which has external teeth 46 adapted for engagement with the teeth of the slidable lock ring in still another longitudinal position to prevent rotation of the housing in either direction. Means associated with the manual control lever 19 position the lock ring 90 for registration with the teeth of ring gear 88 during forward speed, free wheeling and hill-holding (position a, Fig. 12) for registration with the clearance space 94 when the transmission is in neutral (position b) and for registration with the ring gear 45 during reversing and braking (positions c and d), for purposes which will hereinafter become apparent. It will be seen that during normal forward-speed operation the lock ring of overriding clutch 88 overcomes the tendency of the housing 30, 31 to rotate in the opposite direction to the rotation of the pump and motor rotors, but permits rotation in the direction of the rotors when they have reached a one-to-one ratio.

To provide for automatic variations in the torque amplification so that the most efficient power transfer may be attained commensurate with the output of the prime mover and the load demand at various speeds, means responsive jointly to the torque resistance (load) of the driven shaft and to the speed of rotation are connected to automatically vary the eccentricities of the pump and motor chambers. The torque resistance of the driven shaft, in general effect, varies substantially inversely with the speed of rotation of the shaft. Theoretically, therefore, in order to obtain the most efficient transmission ratio, or the optimum balance between torque resistance and power input, at various speeds, I have provided an automatic control mechanism which operates on the principle of balancing the reacting torque exerted by the driven shaft against centrifugal force which is a function of the speed of rotation of the driven shaft. The mechanism consists of a flexible, or loose coupling, generally indicated at 13, made up of two parts; a hollow ring-shaped housing element 95 splined, as at 96, to the transmission shaft and a ring-shaped disk element 97 rotatable within the housing element 95 and rigid with the driven shaft 14 (see Fig. 4). The transmission shaft is coaxially alined with and suitably journaled within the driven shaft, as indicated at 98. The linkage between the two elements 95 and 97 is effected by means of centrifugal elements 99 having pins or studs 100 extending through contour slots 101 and 102 in the faces of the elements 95 and 97, respectively, (see Figs. 7, 8 and 9). Power is transmitted directly through the pins from one element to the other.

The contour slots 101 and 102 have the same configuration but are reversely formed in the elements 95 and 97 so that the reacting torque between the transmission shaft and the driven shaft tends to hold the centrifugal elements inwardly against the centrifugal force exerted thereon by rotation of the shafts. Thus the centrifugal elements seek automatically a position in which the tangential force exerted by the slots on the pins as a result of the torque produced by the motor rotor is balanced by the centrifugal force produced by the centrifugal elements on the pins in all positions. When the load is increased the centrifugal elements tend to move inwardly and as the load is decreased the elements move outwardly. Such motion causes relative rotational movement between the coupling elements 95 and 97 in accordance with the load-speed requirements which motion may be transmitted to the eccentric sleeves 60 and 61 to effect variations in the torque amplification ratio commensurate with the load demand at all speeds.

The curve of the contour slots 101 and 102 is generated from a formula in which the component $F_1$ of the centrifugal force ($F_c$) exerted by the centrifugal elements on the slots is equated with the component $F_1$ of the torque moment (F) exerted on the centrifugal elements as a result of the torque at the couple. Thus referring to Fig. 14, $$F_1 = \frac{F_c \cos a}{2}; F_1 = F \sin a$$

where $a$ is the angle between the radius ($r$) and the normal to the tangent to the curve at the point of contact of $r$ with the curve.
Then $$\tan a = \frac{F_c}{2F}$$

The centrifugal force ($F_c$) may be computed from the weight of the centrifugal elements, the acceleration due to gravity, the linear velocity of the elements at a particular speed and the moment arm ($r$) or distance of the element from its center of rotation. The torque at the control couple and, hence the torque moment at distance $r$, may be computed from the maximum engine torque ($T_e$), and the transmission ratio R (determined by the setting of the eccentric sleeves 60 and 61) from the following formula $$F = \frac{RT_e}{r}$$

Accordingly, the formula, $$\tan a = \frac{F_c}{2F}$$

may be utilized as a basis for approximating graphically or empirically the curve of the contour slots for a particular installation taking into consideration the desired characteristics of the particular application.

From a consideration of the foregoing, it will be clear that relative rotational movement is effected between the elements 95 and 97 of the coupling 13 in accordance with the load speed requirements. The mechanism for transmitting this relative control movement to the eccentric sleeves 60 and 61 of the transmission unit to effect automatic variations in the torque amplification ratio commensurate with the load demand, is illustrated in Figs. 4, 10 and 15. It will be seen that the ring housing 95 carries at one end a series of fingers 110 for engagement with internal slots 111 in the internal portion 112 of a compound nut 113 which surrounds the driven shaft 14. Also cut in the internal portion of the nut are internal helical splines or threads 114, which engage a helical spline sleeve 115, keyed as at 116, to the driven shaft 14. Thus relative movement between the elements 95 and 97 causes longitudinal movement of the nut 113 along the shaft 14 by screw action. The nut 113 has an external portion 117 freely rotatable with respect to the inner portion 112 and maintained in alinement therewith by a suitable thrust bearing, herein disclosed as a ball bearing 118. The bearing 118 permits rotation between the internal portion 112, which is associated for rotation with the shaft 14 and coupling 13, relative to the external portion 117, which is associated with the housings, 30, 31 and 81, as will become apparent hereinafter. Yet, the longitudinal movement of the nut is unaffected by such relative rotation.

For transferring this longitudinal movement to the sleeves 60 and 61, a disk 119, rotatable on a hub 120 of the ring housing 95, is provided with a hub 121 extending in concentric spaced relation to the path of longitudinal travel of the nut 113. The sleeve has internal helical splines 122, which engage external helical threads 123 formed on the external portion 117 of the nut 113. Longitudinal movement of the nut rotates disk 119. The disk 119 is formed with a gear sector 124 over a portion of its periphery adapted for engagement with a gear 125. The gear 125 is rigid with a shaft 126 journaled for rotation in axially alined bores 127 and 128 in the peripheral walls of the housings 31 and 81. The forward end of the shaft 126 carries the cluster gear 67, 68, 69. Hence rotation of the hub 121 adjusts the eccentricity of sleeves 60 and 61. Fingers 130, operatively associated with manually supervised control means (hereinafter to be described) for the sleeves 60 and 61 are adapted for engagement with slots 131 formed in the external portion 117 of nut 113. Their function is to prevent the external portion from merely rotating on the internal portion during longitudinal movement of the nut, thereby failing to transmit rotary motion to the disk 119. The fingers 130 are operative, however, to rotate the external portion of the nut in response to the manually supervised control means, to rotate the disk 119 and thereby adjust the eccentricity of sleeves 60 and 61 to initiate power transmission.

Relative rotational movement between the two parts 95 and 97 of the flexible coupling 13 is thus transferred to the eccentric sleeves 60 and 61 to effect speed changes in accordance with load-speed requirements. As the sleeves 60 and 61 are moved from their neutral position, a driving torque is transferred to the motor rotor which in turn transfers it to the ring housing 95 and hence through the centrifugal elements 99 to the disk 97 and driven shaft 14. As the speed of rotation of the driven shaft increases and the torque at the couple decreases, the centrifugal elements will tend to move outwardly in the contour slots to a position at which the component of centrifugal force, acting in the contour slots, balances the torque demand component, also acting in these slots. As the centrifugal elements move outwardly, the transmission ratio decreases and the speed increases. When the driving and driven shafts are rotating at the same speed, the condition of fixed direct drive coupling will prevail. If the load is increased beyond the point where the torque developed (at the speed at which the prime mover is operating) will balance the reacting torque, the centrifugal elements will move inwardly, causing relative movement between ring housing 95 and disk 97. This, in turn, will cause the nut 113 to move along the sleeve 115 and, by screw action, cause the disk 119 to rotate with respect to the housings 30, 31 and 81, which movement is transferred to the eccentric sleeves 60 and 61 through gear 125, shaft 126 and cluster gear 67, 68 and 69. This movement will continue until the sleeves have been rotated sufficiently to cause the transmission to produce sufficient power torque amplification to compensate for the increase in load, the whole unit again functioning as a transmission rather than a direct drive coupling. As the load torque diminishes the centrifugal elements will again move outwardly until the torque developed by the prime mover is equal to the load torque and the unit will again function as a direct drive coupling.

In order to initiate the transmission of power from the pump to the motor through the influence of manually supervised control means, the fingers 130 which engage the external portion of the compound nut 113, are rotated. This movement obviously causes rotation of the sleeves 60 and 61 from their neutral setting to initiate movement and thereafter the transmission is controlled automatically by the couple. To this end a control element 132, freely rotatable on the driven shaft 14, carries the fingers 130. An internal gear 133 is formed on the flanged end of the element 132 for engagement with pinions 134 of gear elements 135 journaled in the hub portion 87 of the bell housing 81. The gear elements 135 carry on their opposite ends pinions 136, which engage a peripheral gear 137 on a helically splined sleeve 138, which is also freely rotatable, on a bearing sleeve 139, on the shaft 14. The splined sleeve 138 is engaged by a nut 140 having complementary internal helical threads 141 which, when the nut is moved longitudinally along the sleeve 138, rotates the latter through the agency of its spiral-threaded engagement therewith. The nut 140 is internally slotted, as at 142, to receive fingers 143 of a flanged disk element 144, which is bolted, as at 145, to the hub 87 of the housing 81. The function of the fingered element 144 is to prevent rotation of the nut 140 relative to the housings 30, 31 and 81.

Means are provided for imparting longitudinal movement to the nut 140 to the end that rotational movement be imparted to the sleeve 138, hence to the pinion elements 135 and to the fingers 130. Referring to Figs. 4, 11 and 15, the nut 140 has an external portion 150, freely rotatable thereon, through the agency of a roller bearing 151. The external portion 150 is connected, herein by a trunnion engagement 152, with a control lever 153 for imparting longitudinal movement to the nut. The roller bearing engagement between the two parts of the nut permits the inner portion to rotate with the housings 30, 31 and 81 with which it is associated, while permitting the outer portion to remain stationary with the control lever with which it is associated.

It will be understood that rotation of the sleeves 60 and 61 and the ported division plate 64 in one direction (counterclockwise, as seen in Figs. 5 and 6) causes the transmission of power in a forward speed direction, that is, in the same direction as the prime mover. Rotation in the opposite direction (clockwise, as seen in Figs. 5 and 6) causes reverse power transmission. Accordingly, provision is made for longitudinal movement of the nut 140 under the influence of the control lever 153 in one direction (to the left, as seen in Fig. 4) for forward speed operation, and to the right for reverse.

Since it is desirable to operate the control lever 153 by vacuum power, which is ordinarily readily available in motor vehicles, a vacuum motor 15 (see Figs. 1, 4, 11 and 16) is suitably secured to the automobile frame adjacent the remote end of the control lever 153. The motor comprises a cylinder 161 having suitable intake and exhaust ports 162 and 163 connected through conduits 164 and 165 to the control valve mechanism 17. The piston 166 is suitably mounted in the cylinder for reciprocation and has a piston rod 167, connected by means of a slotted linkage 168 with the end of the control lever 153. The control lever is pivoted, as at 169, to a rigid bracket 170, so that motion of the piston to the right (as seen in Fig. 4) will cause longitudinal movement of the nut 140 to the left.

A selector mechanism, generally indicated at 16, under the control of the hand lever 19, is provided for limiting the movement of the control lever 153 for forward, neutral, braking and reverse operation of the transmission. Referring to Figs. 4, 11, 12 and 13, the selector mechanism comprises a bracket 171 rigid with the bracket 170 and having grooves 172 and 173 for the reception of a slotted plate 174 slidable therein. The slotted plate is connected for concurrent actuation, by the control lever 19, with the slidable lock ring 90. The linkage connection comprises a lever 175 rigid with the plate 174, having a slotted lost motion connection 176 with one arm 177 of a bell crank pivoted as at 178, to a bracket 183. The other arm 179 of the bell crank has a sliding connection 180 with a trunnion 181 formed rigidly on the periphery of the lock ring 90. A rod 182, rigid with the bell crank at its pivot point, extending at right angles thereto and journaled in brackets 183 (Fig. 11), carries a lever 184 having a sliding connection 185 with a trunnion 186, diametrically opposite the trunnion 181 on the lock ring 90. Linkage 187 and 188 (Fig. 1) of any suitable type connect the bell crank with the hand lever 19 for simultaneous actuation of the lock ring 90 of the overriding clutch mechanism 80 and the plate 174 of selector mechanism 16.

The slidable plate 174 of the selector is slotted to receive the control lever 153 therethrough and limit its movement by the vacuum motor 15 to a central position (as seen in Fig. 13), when the hand lever 19 is in "neutral" position, to the left for "forward" to the left for "braking," and to the right for "reverse." Accordingly, the plate has a central longitudinal slot 200 and three laterally extending and longitudinally spaced slots 201, 202 and 203 opening from the central slot 200, two the left and one to the right. When the hand lever 19 positions the plate for "neutral" the lock ring 90 of the overriding clutch mechanism is located in its central position b (Fig. 12) permitting free rotation of the pump-motor housing in either direction; when the plate is in "forward" position, the lock ring is registered with the ring 88 of the overriding clutch (position a) permitting rotation of the housing in a forward speed direction only; when the plate is in "reverse" or "braking" positions, the ring is registered with the teeth 46 (position c or d) to prevent rotation of the casing in either direction.

The vacuum motor 15 is controlled by the valve mechanism 17 under the supervisory control of the manual devices 18 and 19 to the end that the control lever 153 may be appropriately actuated to initiate and, under some conditions, control and govern the operation of the transmission. Generally the functions of the valve mechanism, as adapted for use in the present embodiment of the invention, are: To connect a suitable source of vacuum supply to the vacuum motor 15 to hold the control lever centered when the mechanism is in "neutral" and "idling" position; to connect such source of supply for actuation of the control lever for "forward" speed operation as an incident to initial accelerator depression;

to similarly control the vacuum motor for "reversing" and "braking" positions of the control lever; and to effect limit or incremental control of the vacuum motor during the "braking" operation.

The valve in the present instance consists of a valve body 204 (Figs. 16 to 23, inclusive) having a central bore 205 and provided with six longitudinally extending ducts 206 to 211 inclusive, opening to one end of the valve body. A transverse duct 212 interconnects the longitudinal ducts 206 and 209 and a second transverse duct 213 interconnects the longitudinal ducts 208 and 211. The longitudinal ducts 207 and 210 open to the central bore 205 through radial ducts 214 and 215 respectively. A suitable source of vacuum power such as the engine manifold is connected through a conduit 216 which communicates through a radial duct 217 with the central bore 205, and a radial conduit 218 similarly communicates with the central bore and is vented to the atmosphere through a screen 219. The conduits 164 and 165 which lead to the vacuum motor are connected through ducts 220 and 221 respectively with the longitudinal ducts 209 and 211, respectively. A longitudinal slidable sleeve 222 is fitted within the central bore and provided with parallelogram-shaped ports 223, 224, 225 and 226 equally spaced peripherally of the sleeve and adapted to open to the radial ducts 214, 217, 215 and 218, respectively, in all longitudinal positions of the sleeve.

Fitted within the sleeve and rotatable with respect to it is a valve plug 227 having ports 228 and 229 adapted to interconnect adjacent sleeve ports selectively upon rotation. The valve plug 227 (Figs. 16 and 17) projects outwardly from one end of the valve body and carries eccentrically a pin 230 for engagement with a cam plate 231 which is oscillatable with a lever 232 about a shaft 233. The lever 232 is connected with the accelerator 18 by a rod 234 and has a lost motion connection 235 with a lever 236 rigid with the shaft 233 which connects with the carburetor 237 through linkage 238 (Fig. 1). The cam curve is so formed that upon initial depression of the accelerator, motion is transmitted through the rod 234 to the cam plate to effect a rotation of the valve plug. Further depression of the accelerator affects the carburetor, after the lost motion of connection 235 has been taken up, but has no further effect on the valve plug 227.

Fitted in the right end of the valve body (Fig. 17) to which the longitudinal ports open is a reversing plate 243 provided with ports 244 and 245 (Figs. 19-23) adapted upon rotational shifting movement to interconnect adjacent longitudinal ports 207 with 208 and 209 with 210 or selectively 206 with 207 and 210 with 211. A rigid lever 248 on the reversing plate projects therefrom for actuation by a linkage 249 associated with a cam 250 (Fig. 16). The cam is operatively connected with the hand lever 19 on the steering column by a suitable linkage 251. The cam curve is so formed as to impart motion to the linkage 249 for shifting the reversing plate 243 only when the hand lever is moved to "reverse" position.

The operation of the valve mechanism is as follows: When the accelerator pedal is in idling position the valve plug connects the vacuum line 216 with the conduit 164, through the circuit 216—217—224—228—225—215—210—245—209—220—164. Correspondingly the atmosphere line 218 is connected with conduit 165, through the circuit 218—226—229—223—214—207—244—208—213—211—221—165. In this setting the piston of the vacuum motor tends to move to the left (Figs. 4 and 16) and acts to hold the control lever in neutral position (Fig. 13). As the accelerator is depressed, this motion is transferred through the linkage 18—234—232—231—230—227, to rotate the valve plug. This causes the vacuum line 216 to be connected with conduit 165, through the circuit 216—217—224—229—223—214—207—244—208—213—211—221—165. Similarly, the atmosphere line 218 is connected with conduit 164, through the circuit 218—226—228—225—215—210—245—209—220—164. This setting causes the piston of the vacuum motor to move the control lever into starting or engaging position, assuming the selector to have been shifted to "forward" or "braking" position. Further depression of the accelerator will not rotate the valve plug because of the contour of the cam 231. As long as the accelerator is sufficiently depressed to maintain the valve plug in this position, control lever movements are unaffected and the transmission remains engaged in automatic control. If the accelerator is brought back to its idling position, the valve plug rotates to reverse the connections and the transmission will be brought back to "neutral" position.

In order to cause the transmission to function in reverse, the operator's control lever 19 is shifted to "reverse" causing rotation of the reversing plate 243, through the connections 19—251—250—249—248—243. Such movement causes the vacuum line 216 to be connected with the conduit 165, through the circuit 216—217—224—228—225—215—210—245—211—221—165, and the atmosphere line 218 to be connected with the conduit 164, through the circuit 218—226—229—223—214—207—244—206—212—209—220—164. Thus, when the accelerator is in idling position and the selector plate 174 shifted to "reverse," vacuum power holds the control lever 153 centered or in "neutral" against the selector plate until the accelerator is depressed. Upon depression of the accelerator, the vacuum line 216 is connected to the opposite end of the vacuum motor, through the circuit 216—217—224—229—223—214—207—244—206—212—209—220—164, and the atmosphere line 218 is connected to the conduit 165, through the circuit 218—226—228—225—215—210—245—211—221—165. This causes movement of the control lever into the reversing slot 201 (Fig. 13), thus actuating the compound nut 140 to initiate reversing movement.

The operation of the transmission and its associated controls when applied to an automotive vehicle, as illustrated in Fig. 1, is as follows: Assuming the operator's control lever 19 to be in "neutral" position, the lock ring 90 of the overriding clutch mechanism will be in neutral position b, permitting free rotation of the pump-motor housing, and the selector plate 174 will be in neutral position (Fig. 13). With the centrifugal elements 99 in their outermost position, as seen in Fig. 4, and the control lever 153 centered or in "neutral," the pump chamber will have no eccentricity and when the engine is started, no fluid will be displaced to the motor chamber which is in position of maximum eccentricity. With the accelerator, or foot throttle 18, in idling position, vacuum power is connected through the valve 17 to the vacuum motor 15 tending to move the control lever 153 to the right (Fig. 13). Depression of the accelerator with the parts in this position will have no effect on the control lever 153 since the selector plate holds it centered. To initiate forward movement of the vehicle, the operator simply moves the hand lever 19 to "forward" and depresses the accelerator. This movement of the hand lever positions the selector plate 174 for "forward" and engages the lock ring 90 in position a permitting forward rotation only of the pump-motor housing 30, 31. Depression of the accelerator rotates the valve plug 227 to reverse the vacuum power connections and cause the piston of the vacuum motor to move the control lever 153 into the starting or engaging position (to the left). This movement is transmitted through the nut 140, splined sleeve 138, pinion elements 135, fingers 130 to rotate the external portion 117 of the compound nut 113. This rotational movement is in turn transmitted to the eccentric sleeve 60, 61, through elements 121, 119, 126, which rotates the cluster gear to create eccentricity in the pump chamber, causing fluid displacement and power transmission to the transmission shaft 41.

In view of the large reacting torque at the control couple 13 during starting, the centrifugal elements 99 will tend to move inwardly. Such movement tends to bring the eccentricity of the pump chamber back to zero, but as the nut 140 is moved to the left (Fig. 4) under the influence of the engaging control lever 153, this tendency is counteracted so that when the control lever has reached the limit of its movement, the degree of eccentricity of the pump and motor chambers will be under the sole control of the centrifugal elements 99, which automatically seek a balance between the reacting torque and the centrifugal force. As long as the accelerator is depressed sufficiently to keep the valve plug 227 in this operating position, the transmission remains engaged in automatic control.

If the accelerator is brought back to its idling position the transmission will be brought back to neutral in which case the vehicle will be permitted to coast freely without motor drag, more commonly denoted "free wheeling." Thus, with the lock ring 90 positioned to permit free rotation of the housing 30, 31 in a forward direction and, upon reversal of torque at the control couple 13 when coasting, the centrifugal elements seek their outermost position. Under these conditions, the control lever 153 being in neutral or centered position, there is no eccentricity in the pump chamber so that free relative rotation may be had between the pump rotor which is rigid with the engine shaft and the housing 30, 31, 81 which is carried around by the motor rotor on the transmission shaft.

Similarly, in its normal setting for forward speed operation, the transmission functions as a so-called "no back-up" brake to facilitate control of the vehicle when starting and stopping on ascending grades. In this setting the housing 30, 31 is prevented from reverse rotation and, due to the large eccentricity in the motor chamber and concentricity in the pump chamber, fluid cannot be pumped in a reverse direction from the motor to the pump.

In order to cause the transmission to function in reverse, the operator's control lever 19 is moved to "reverse" position, causing the lock ring 90 to engage the annulus 45 of the overriding clutch mechanism to prevent rotation of the housing in either direction and causing the selector plate 174 to move to its "reverse" position. The reversing plate 227 is concurrently rotated to change the valve connections, to the end that the control lever 153 may be moved to its right hand position (Figs. 4 and 13) upon depression of the accelerator. Such movement causes the sleeve 138 to rotate in the opposite direction from that for forward speed operation and to transmit the control lever movement to rotate the sleeves 60 and 61 reversely from their neutral position. Thus, upon fluid displacement, the motor rotor is rotated in the opposite direction from that of the pump rotor. While the transmission operates in reverse the automatic control couple mechanism 13 does not function.

It is frequently desirable and sometimes necessary that the transmission be used as an adjunct to the brakes in descending long steep hills. To this end the transmission of the present invention is so arranged that it may be easily and simply controlled to effect any degree of braking between direct motor drag and complete locking of the driven shaft. This control is accomplished in the present instance primarily by means of the sliding sleeve 222 of the valve mechanism 17. Braking is effected by locking the pump-motor housing against rotation in either direction and limiting movements of the control lever 153, under the influence of the valve controlled vacuum motor, to positively regulate the transmission ratio between the pump and the motor. Under these circumstances the load torque being reversed the degree of reverse pumping action from the motor to the pump will determine the amount of braking. This incremental or limit control is determined by the degree of accelerator depression. In other words during the range of initial accelerator depression, prior to carburetor control, which causes rotation of the valve plug 227, the parallelogram-shaped ports 223 to 226 of the sleeve are so shifted as to permit only incremental or step-by-step movement of the control lever 153 in response to step-by-step movements of the accelerator in its range of initial depression.

In the present instance these objectives are accomplished by mechanically connecting the sliding sleeve 222 with the piston of the vacuum motor, as by a flexible shaft 260 (Figs. 1 and 17). Assuming, for example, that the operator's control lever 19 has been moved to its "braking" position, the lock ring 90 will be positioned to prevent rotation of the pump-motor housing in either direction, the centrifugal elements will be in their outermost position, and the pump motor chambers will be in neutral position. Referring to Figs. 16 to 19, inc., as the accelerator pedal is slightly depressed, the valve plug will be rotated to move its ports 228 and 229 from "neutral" or "idling" position as seen in Fig. 19 to the position shown in Fig. 18ª, interconnecting parallelogram ports 223 and 224 on the one hand and ports 225 and 226 on the other. These valve connections will cause the control lever 153 to start moving to engaging position as in normal operation when the accelerator is initially depressed to the limit of its preliminary movement. Since, however, the sleeve 222 is connected to the piston of the vacuum motor, any movement of the control lever is transferred to longitudinal movement of the sleeve. The ports of the sleeve being parallelogram-shaped or cut at an angle, longitudinal movement of the sleeve, as indicated in Fig. 18ᵇ, will immediately close the openings between the valve plug and the sleeve and control lever movement will be stopped. Thus, the transmission will not be permitted to go to direct drive when the load torque is reversed in descending a grade but remains in an intermediate ratio setting which depends on the position of the accelerator pedal within its range of initial depression. In the position assumed, there will be only a very slight eccentricity in the pump chamber and since the housing is locked against rotation in either direction a condition of rather severe braking is effected. Further depression of the accelerator pedal causes the valve plug to rotate further, as seen in Fig. 18ᶜ, again carrying its ports within the range of the parallelogram ports of the sleeve. This results in further movement of the control lever to produce a different transmission ratio setting in which the braking is less severe. Such movement of the control lever, however, causes the sleeve 222 to move and close the communication between the sleeve ports and valve plug ports (Fig. 18ᵈ). Movement of the accelerator pedal to the limit of its initial depression effects a condition of direct motor drag since the transmission then becomes fully engaged. If the accelerator pedal is raised, the valve play will be rotated in the opposite direction, to the position shown in Fig. 18ᵉ. Upon such a reversal of connections the piston of the vacuum motor will commence to move in the opposite direction causing the sleeve 222 to move to the right, as indicated by the arrow in Fig. 18ᵉ. This closes the port connections until the accelerator pedal is raised further to rotate the valve plug as seen in Fig. 18ᶠ to again open the ports and cause control lever movement. If the accelerator pedal is raised to its top limit the drive shaft will be locked against rotation because the sleeves 60 and 61 will be in neutral setting in which case fluid cannot be pumped reversely from the hydraulic motor chamber to the pump chamber.

I claim as my invention:

1. A hydraulic transmission comprising, in combination, coaxially alined driving, transmission and driven shafts, a rotary pump unit on said driving shaft, a rotary motor unit on the adjacent end of said transmission shaft, a common housing for said units, a pair of eccentric sleeves rotatably mounted within said housing and peripherally defining pump and motor chambers respectively, a ported division plate between said units, actuating means for rotating said sleeves to vary the capacities of said units simultaneously and in opposite senses, and a control couple drivingly connected between said transmission and driven shafts, said couple including means connected with said actuating means for producing control movements responsive jointly to the speed of rotation and the load demand at said couple.

2. A torque amplifying transmission comprising, in combination, coaxially alined driving, transmission and driven shafts; a rotary pump on said driving shaft, a rotary motor on the adjacent end of said driven shaft, port means for the passage of pressure fluid from said pump to said motor, means for varying the capacities of said pump and said motor simultaneously and in opposite senses, a control couple drivingly connected between said transmission and driven shafts, said couple including means for producing control movement in accordance with changes in the speed of rotation of said couple and the load demand on said couple, and means for transmitting said control movement to the capacity varying means for said pump and said motor.

3. A torque amplifying transmission mechanism comprising, in combination, coaxially alined driving, transmission and driven shafts, a variable capacity driving connection between said driving and transmission shafts, a control couple for transmitting power between said transmission shaft and said driven shaft, said control couple including means for producing control movement responsive jointly to changes in the speed of rotation and the load torque of said driven shaft, and means for transmitting such control movement to adjust said variable capacity driving connection.

4. The combination of a pair of coaxially alined rotary shafts, an adjustable transmission unit for driving one of said shafts from the other at variable torque amplification ratios, said transmission unit including a pump housing and a motor housing secured together and mounted for rotation concentrically of the adjacent ends of said shafts, a pair of eccentric sleeves eccentrically mounted within said housings to define pump and motor chambers, said sleeves being rotatable to vary the eccentricity between said shafts and the inner peripheries of said sleeves, vane carrying rotors on said shafts within said pump housing and said motor housing respectively, and means for controlling the flow of fluid between said housings.

5. A hydraulic transmission unit comprising, in combination, a drive shaft, a radially slidable vane pump on said shaft, a driven shaft coaxially alined with said drive shaft, a radially slidable vane motor on said driven shaft, a rotatable housing defining pump and motor chambers for said pump and motor respectively, passage means for the delivery of pressure fluid from said pump to said motor and of exhaust fluid from said motor to said pump, and means for varying the pump and motor capacities simultaneously and in opposite senses from one condition in which the pump has no eccentricity and the motor has a maximum eccentricty to another condition in which the eccentricities of said pump and said motor are the same, whereby, when the latter condition obtains, pumping action ceases and housing rotates with the pump and motor.

6. In a hydraulic transmission apparatus, the combination of a fluid pump adapted for connection to a source of rotary power, a fluid motor coaxially alined with said pump and adapted to deliver rotary power to a driven member, said pump and said motor being of the radially slidable vane type, eccentric sleeves defining the inner peripheral surfaces of the pump and motor chambers, means for rotating said sleeves to vary the volumetric delivery and capacity of the pump and motor respectively and in opposite senses, a ported division plate between said pump and said motor for the passage of pressure fluid from the pump to the motor and for the return passage of exhaust fluid from the motor to the pump, and means for rotating said division plate concurrently with the rotation of said sleeves to follow the axes of symmetry between said pump and said motor.

7. A torque multiplying hydraulic transmission comprising, in combination, coaxially alined rotary shafts, a variable capacity rotary hydraulic unit on the adjacent end of each of said shafts, a housing defining a common enclosing chamber for said units, said units being of the radial slidable vane type, the vanes of said units being adapted for sliding contact with the inner periphery of said housing, means supporting said housing for rotation under the influence of the pressure fluid of said units, and means for locking said housing against rotation in a direction opposite to that of said units.

8. A torque multiplying transmission comprising, in combination, a drive shaft; a transmission shaft; a variable capacity driving connection between said shafts adjustable to change the torque amplification ratio; a driven shaft coaxially alined with said transmission shaft; a flexible control couple for transmitting power between said transmission shaft and said driven shaft; said couple including a pair of disks rigid with said transmission and driven shafts respectively and disposed in face-to-face relation, centrifuge means drivingly connected between said disks and radially slidable therein to produce relative rotational movement between said disks in accordance with the speed of rotation and the load torque of said driven shaft; and means for transmitting such movement to adjust said variable capacity driving connection between said drive and transmission shafts.

9. A hydraulic transmission apparatus comprising, in combination, hydraulic pump and motor units connected together in a closed hydraulic system, means for driving the pump unit, a shaft driven by the motor unit, and means for automatically varying the volumetric capacity of one of said units, said means including an automatic control couple on said shaft responsive jointly to the speed of rotation and the load torque at said couple to transmit control movement to said one unit.

10. In a hydraulic transmission, the combination of a hydraulic pump and motor connected in a closed hydraulic system, means for varying the respective volumetric delivery and capacity of said pump and motor simultaneously and in opposite senses, and control means for effecting such variation automatically in response to variations in load demand, said control means being independent of the power input.

11. A transmission comprising, in combination, a driving member, a driven member, a variable driving connection between said members adjustable to change the power transmission ratio, and control means for adjusting said connection in accordance with a balance condition between the component of centrifugal force acting on said means determined by the speed of rotation of said driven member and the component of the torque moment acting on said means determined by the load on said driven member.

12. A hydraulic transmission comprising, in combination, a hydraulic pump and motor connected together in a closed hydraulic system, control means for varying the volumetric delivery rate of the pump and the capacity of the motor simultaneously and in opposite senses, a transmission shaft driven by said motor, a disk rigid with said transmission shaft, a driven shaft coaxially alined with said transmisison shaft, a disk on said driven shaft in juxtaposed face-to-face relation with said first mentioned disk, said disks having contour slots therein, means for drivingly connecting said disks, said means including a centrifugal element radially slidable in said contour slots, said slots being formed so as to produce relative rotational movement between said disks upon radial movement of said element in accordance with the speed of rotation and the load torque of said driven shaft, and means for transmitting said relative rotational movement to said control means.

13. A torque amplifying transmission comprising, in combination, driving and transmission shafts, variable capacity power transmitting means connected between said shafts, a driven shaft, a member rigid on said transmission shaft, a member rigid on said driven shaft, said members having reversely formed contour slots therein, weighted studs drivingly connected between said members and radially slidable in said slots to produce relative angular rotation between said members, the contour of said slots being such that in any radial position of said studs the centrifugal force thereon is balanced by the torque moment exerted by the members at that position, and means for transmitting said angular rotation to vary the capacity of said power transmitting means.

14. A transmission mechanism comprising, in combination, driving and transmission shafts having a variable capacity driving connection therebetween, a driven shaft, and a control couple drivingly connected between said transmission and driven shafts and connected to vary said capacity, said couple including a disk on said transmission shaft, a disk on said driven shaft disposed in face-to-face relation with said first-mentioned disk, contour slots reversely formed in said disks respectively, means responsive to centrifugal force radially slidable in said contour slots to produce relative rotational control movement between said disks, the curve of each slot being generated in accordance with the formula $$\tan a = \frac{F_c}{2F}$$

where $a$ is the angle between the center of the disk and a tangent to the curve, $F_c$ is the centrifugal force exerted by said means, and $F$ is the torque moment at the point of tangency.

15. In combination with a transmission having a pair of shafts with a variable capacity driving connection therebetween, a flexible control couple adapted to transmit power from the driven end of said transmission to a driven member, said couple including a driving member and a driven member disposed in face-to-face relation, contour slots reversely formed in said members, means responsive to centrifugal force drivingly connected between said members and radially slidable in said slots to produce relative angular rotational movement between said members, the curve of said slots being generated in accordance with the formula, $$\tan a = \frac{F_c}{2F}$$

where $a$ is the angle between the centers of rotation of said members and a tangent to the curve, $F_c$ is the centrifugal force of said means at the point of tangency and $F$ is the torque moment at said point, and means for transmitting said relative rotational movement to vary the capacity of said driving connection.

16. A transmission mechanism comprising, in combination, coaxially alined driving, transmission and driven shafts, a pair of hydraulic rotor units on the adjacent ends of said driving and transmission shafts, a common housing for said units, a pair of eccentric sleeves peripherally defining hydraulic chambers for said units respectively and rotatable in said housing to vary the capacities of said units, means connecting said units in closed hydraulic system, said housing being rotatable with said units when the driving ratio between the driving and transmission shafts is one-to-one, a control coupling drivingly connected between said transmission and said driven shafts permitting relative angular rotation therebetween responsive to speed and load changes, and mechanism for transmitting such rotational movement to said sleeves whether said housing is rotating or stationary.

17. A transmission mechanism comprising, in combination, coaxially alined driving, transmission and driven shafts, a pair of hydraulic rotor units on the adjacent ends of said driving and transmission shafts, a common housing for said units, means movable in said housing to vary the capacities of said units, means connecting said units in closed hydraulic system, said housing being rotatable with said units when the driving ratio between the driving and transmission shafts is one-to-one, a control coupling drivingly connected between said transmission and said driven shafts permitting relative angular rotation therebetween responsive to speed and load changes, and mechanism for transmitting such rotational control movement to said movable means uniformly whether said housing is rotating or stationary.

18. A transmission mechanism comprising, in combination, coaxially alined driving, transmission and driven shafts, a variable capacity driving connection between said driving and said transmission shafts, including normally stationary actuating means rotatable with said driving and transmission shafts when the ratio therebetween is one-to-one, a flexible control couple drivingly connected between said transmission and driven shafts permitting relative angular rotational movement therebetween responsive to speed and load changes, and mechanism for transmitting such movement to said actuating means unvaryingly irrespective of its rotation.

19. A transmission mechanism comprising, in combination, driving and transmission shafts having a variable capacity driivng mechanism connected therebetween, normally stationary actuating means for varying such capacity, said means being rotatable with said mechanism when the ratio therebetween is one-to-one, a flexible control couple on said transmission shaft adapted for connection with a driven member, said couple permitting relative angular rotational movement between said transmission shaft and the driven member responsive to speed and load changes, and mechanism for transmitting such angular rotational movement to said actuating means whether it is rotating or stationary.

20. A transmission mechanism comprising, in combination, coaxially alined driving, transmission and driven shafts, a pair of rotary hydraulic units on the adjacent ends of said driving and transmission shafts connected together in closed hydraulic system, means for varying the relative capacities of said units to change the torque-speed ratio between said driving and transmission shafts, a housing for said units rotatable therewith when the driving ratio between said shafts is one-to-one, a flexible control coupling drivingly connected between said transmission and driven shafts permitting relative angular rotation therebetween responsive to speed and load changes, and mechanism for transmitting such rotational control movement to said means irrespective of the rotation of said housing.

21. A transmission mechanism comprising, in combination, driving and driven shafts, driving means connected between said shafts and adjustable to vary the transmission ratio therebetween, control means responsive jointly to the speed and load of the driven shaft for varying said ratio, and manually supervised means for controlling said ratio independently of said control means when the load torque on said driven shaft is reversed.

22. A transmission mechanism comprising, in combination, coaxially alined driving, transmission and driven shafts, a variable capacity driving connection between said driving and transmission shafts, a control coupling drivingly connected between said transmission and driven shafts for producing control movement responsive to the load on said driven shaft, means for transmitting such movement to vary the capacity of said driving connection, and manually supervised control means for varying said capacity independently of said control couple.

23. A transmission mechanism comprising, in combination, driving and driven members, a variable transmission mechanism connected between said members, control means for automatically varying the transmission ratio in inverse ratio to the load torque on said driven member when the driven member is rotating in one direction, and manually supervised means for varying the transmission ratio independently of said control means when said driven member is rotating in the opposite direction.

24. Mechanism of the character described comprising, in combination, an internal combustion engine, a change-speed transmission drivingly connected between said engine and a device to be driven, means for varying the driving ratio of said transmission between neutral and a one-to-one ratio, an accelerator pedal for said engine, means responsive to initial accelerator depression for drivingly engaging said transmission, and means for automatically effecting the variations in the driving ratio after engagement, said last named means being responsive jointly to the torque demand and the speed of rotation of said driven device.

25. Mechanism of the character described comprising, in combination, an internal combustion engine, a change-speed transmission drivingly connected between said engine and a device to be driven, said transmission being variable in minute increments between neutral and a one-to-one driving ratio, said transmission being operative as a brake on said driven device upon reversal of load torque, an accelerator for said engine, said accelerator having an initial range of depression prior to control of said engine, means responsive to depression of said accelerator through said initial range for engaging said transmission, means for controlling the driving ratio of said transmission automatically after engagement, and means for controlling the degree of braking exerted by said transmission on said driven device in accordance with the position of said accelerator in said initial range.

26. Mechanism of the character described comprising, in combination, a driving member, a driven member, a variable speed transmission between said driving and driven members, an accelerator pedal for said driving member, means responsive to initial movement of said accelerator pedal for engaging said transmission, and means responsive to movements of said accelerator pedal within its range of initial movement for controlling the degree of braking exerted by said transmission on said driven member upon reversal of load.

27. Mechanism of the character described comprising, in combination, a driver, a driven element, a variable speed transmission connected between said driver and driven element, said transmission being variable in minute increments upon reversal of load torque for exerting a variable braking effect upon said driven element, a lever for controlling the speed of rotation of said driver, said lever having a range of initial movement prior to control of said driver, and means responsive to movements of said lever within said initial range for controlling the degree of braking effect exerted by said transmission on said driven element.

28. Mechanism of the character described comprising, in combination, an internal combustion engine, a variable speed transmission drivingly connected between said engine and a device to be driven, means responsive to the load and speed of said driven device for controlling the transmission ratio, and manually supervised control means for adjusting said transmission to variably brake said driven device upon reversal of load torque.

29. Mechanism of the character described including, in combination, a variable capacity brake mechanism, a control lever for said brake mechanism shiftable incrementally to control the braking effect of said mechanism, a pressure fluid operated actuator for said lever, valve means for controlling the flow of pressure fluid to said actuator, manually operable means for said valve means shiftable to cause fluid to flow to said actuator, and means in said valve responsive to movement of said actuator for stopping the flow of fluid from said valve to said actuator until said manual means is again shifted, whereby to effect limit control of said actuator responsive to limit movements of said manual means.

30. Mechanism of the character described comprising, in combination, an internal combustion engine, a variable capacity transmission drivingly connected with a driven device and adapted for braking said device upon reversal of load torque, a control lever for said transmission shiftable incrementally to control the braking effect on said device, a pressure fluid operated actuator for said lever, valve means for controlling the flow of pressure fluid to said actuator, an accelerator for said engine connected to control said valve means upon initial depression prior to engine control to cause fluid to flow to said actuator, and means in said valve responsive to movement of said actuator for stopping the flow of fluid from said valve to said actuator until said accelerator is further depressed, whereby to effect limit control of said actuator responsive to limit movements of said manual means.

31. Mechanism of the character described comprising, in combination, an internal combustion engine, a variable speed transmission drivingly connected between said engine and a device to be driven, means for controlling said transmission to variably brake the driven device upon reversal of load, said means including a control lever for said transmission incrementally shiftable to vary the braking effect, a vacuum motor for actuating said lever, means connecting said motor with the manifold of said engine, and valve means for controlling the vacuum power from said manifold to said motor.

32. Mechanism of the character described comprising, in combination, coaxially alined driving and driven shafts, a variable capacity rotary hydraulic unit on the adjacent end of each of said shafts, a housing defining a common hydraulic chamber for said units, means for controlling the distribution of fluid between said units, means supporting said housing for rotation by the fluid pressure of said units, means for selectively controlling the rotation of said housing, means including a control lever shiftable selectively in one direction or the other for effecting forward or reverse rotation of said driven shaft, a pressure operated actuator for said control lever, a selector for holding said lever centered in neutral position, said selector being shiftable selectively to permit movement of said lever in one direction or the other, and manually operated means for controlling said selector and the means for controlling the rotation of said housing conjointly.

33. Mechanism of the character described comprising, in combination, driving means, a variable speed transmission drivingly connected between said means and a device to be driven, a control lever shiftable in one direction to engage said transmission for forward speed operation and shiftable in the opposite direction for reverse, a pressure operated actuator for said control lever, a manually operated selector for holding said lever in central neutral position, said selector being selectively shiftable to permit said lever to move in one direction or the other, and a valve mechanism for said actuator manually controlled conjointly with said selector.

34. A mechanism of the character described comprising, in combination, hydraulic pump and motor units connected together in closed hydraulic system, means for driving said pump unit, a device driven by said motor unit, means for automatically varying the volumetric capacity of one of said units between zero and maximum, said last mentioned means automatically seeking a zero displacement control position upon reversal of load torque, and means for preventing fluid displacement of the other of said units upon such reversal to permit free wheeling of said device.

35. A mechanism of the character described comprising, in combination, a driving means, a variable capacity hydraulic pump driven by said means, a vane type hydraulic motor having a rotatable housing defining the pump chamber and connected to receive pressure fluid from said pump, a device driven by said motor, means for controlling the volumetric displacement of said pump between zero and maximum, said last named means automatically seeking a zero displacement control position upon reversal of the load torque, and means for locking said housing against rotation and releasable to permit rotation of said housing upon such reversal of load torque, whereby to permit free wheeling said device.

36. A mechanism of the character described comprising, in combination, hydraulic pump and motor units connected together in closed hydraulic system, means for driving said pump unit, a device driven by said motor unit, and means for automatically controlling one of said units between zero and maximum volumetric displacement, said last named means automatically seeking a zero displacement control position upon reversal of load torque.

FREDERICK O. JOHNSON.